United States Patent

Horne, Jr. et al.

[15] 3,704,671
[45] Dec. 5, 1972

[54] CONVERTIBLE RAIL-HIGHWAY VEHICLE

[72] Inventors: Victor A. Horne, Jr.; Lawrence D. Bradley, both of Kansas City, Mo.

[73] Assignee: Horne-Boatright Chemical Company, Inc., Kansas City, Mo.

[22] Filed: Oct. 7, 1970

[21] Appl. No.: 78,813

[52] U.S. Cl..............105/215 C, 104/242, 104/245
[51] Int. Cl........B61d 15/00, B61f 9/00, B62d 62/12
[58] Field of Search............105/215 C; 104/242, 245

[56] References Cited

UNITED STATES PATENTS

| | | | |
|---|---|---|---|
| 2,482,564 | 9/1949 | Townsend | 105/215 C |
| 3,342,141 | 9/1967 | Browne | 105/215 C |
| 3,228,350 | 1/1966 | Cox | 105/215 C |
| 3,286,657 | 11/1966 | Browne | 105/215 C |

*Primary Examiner*—Arthur L. La Point
*Assistant Examiner*—Howard Beltran
*Attorney*—Don M. Bradley

[57] ABSTRACT

An attachment for a highway vehicle to support the vehicle on rails. The support includes front and rear rectangular sub-frames pivoted beneath the vehicle frame for swinging about respective horizontal axes adjacent the leading ends of the sub-frames and extending transversely of the vehicle. A pair of rail wheel and axle assemblies for each sub-frame are swingable by a fluid piston and cylinder assembly to and from vehicle supporting positions. The end of each sub-frame remote from the corresponding horizontal axis is coupled to the vehicle frame by lost motion linkage and a pair of pneumatic bags are interposed between each sub-frame and the vehicle frame to cushion the vehicle when supported on the rail by the rail wheels.

12 Claims, 10 Drawing Figures

PATENTED DEC 5 1972

INVENTORS.
Victor A. Horne Jr.
Lawrence D. Bradley
BY
Don M. Bradley
ATTORNEY

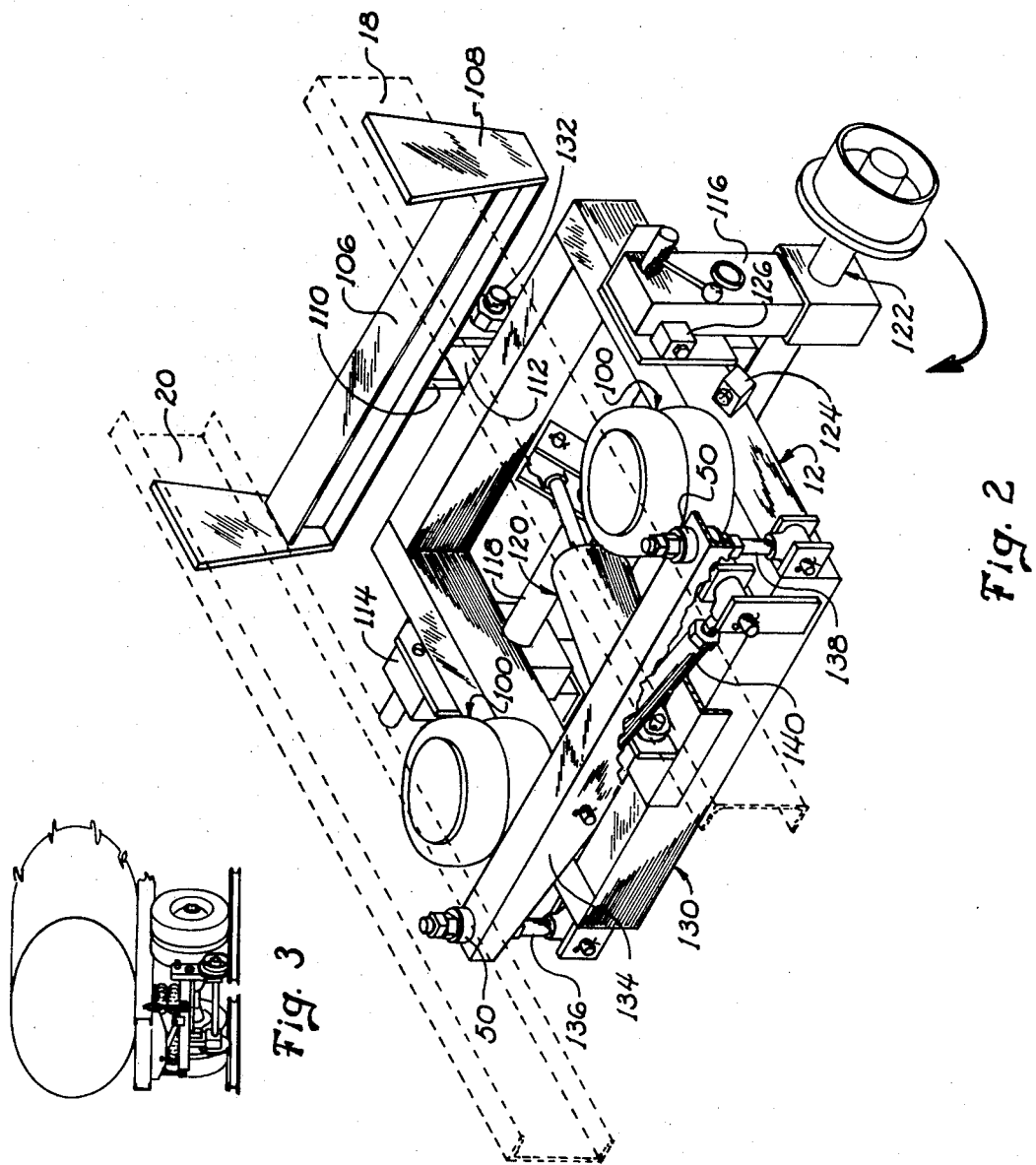

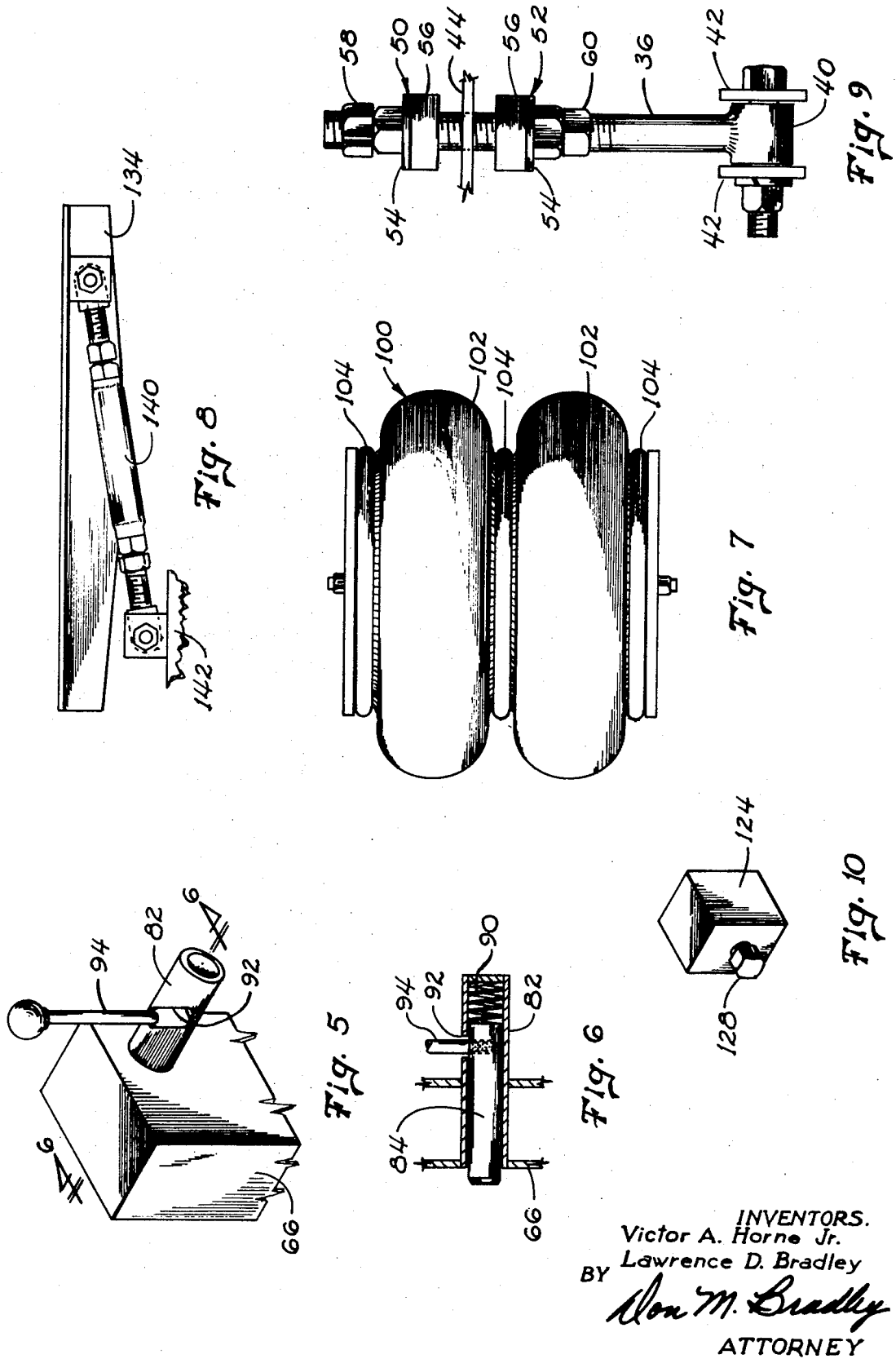

CONVERTIBLE RAIL-HIGHWAY VEHICLE

This invention relates to vehicle construction, and more particularly, to structure providing for the support of highway type vehicles for rail travel.

Conventional highway vehicles are sometimes utilized for travel on railroads and must, of course, be provided with special wheels and supporting structure. Often vehicles of this type must be capable of both highway and rail service. Accordingly, it is desirable that the structure for supporting the vehicle for rail travel be provided as an attachment to be installed on a conventional vehicle and which does not interfere with the functioning of the vehicle when not in use.

An example of a need for vehicles of this type arises from the extensive weed spraying operations carried out along railroad right of ways. Trucks equipped with liquid weed killing chemical tanks and spraying apparatus are driven over railroad tracks during the spraying operation. These trucks move readily over the highways with the flanged or rail wheels in retracted positions when the trucks travel between the chemical supply stations and the rail tracks. They must also be capable of movement off the tracks and onto the roads or highways to yield the right of way to conventional railroad traffic.

While vehicles have long been equipped for both highway and rail travel, the structures heretofore available for this purpose have been relatively complicated, difficult to install and to maintain, and expensive. Efforts to utilize the vehicle spring suspension for cushioning the forces imparted to the vehicles while installed on the rails has resulted in rather complex structural systems. These have not only been difficult to operate but they also have been subject to considerable "down time" during the repair and the obtaining of parts for the relatively complex valving and hydraulic system components. Manifestly, these maintenance procedures are costly in their own right, but the expense is multiplied since entire crews are often idled while the vehicle is being returned to an operative condition.

Accordingly, it is the primary object of the present invention to provide a rugged, yet highly reliable rail support structure for vehicles of this type, which structure is capable of ready movement between the vehicle supporting position and the stand-by position so that the vehicle may be driven either over rails or conventional roadways.

Another important object of the present invention is to provide structure which cushions the vehicle against shocks from relatively rough rail tracks, yet which permits substantially entire support of the vehicle on the flanged rail wheels.

Still another object of the invention is to provide rail supporting structure which may be easily and quickly installed as an attachment to conventional vehicles constructed for highway travel.

A yet further object of the invention is to provide structure of this type having a bare minimum of relatively expensive and difficult to maintain hydraulic components.

Yet another object of the invention is to provide rail support structure for a vehicle which may be easily operated to position the powered vehicle wheels in driving contact with the rails while maintaining substantially the entire support for the vehicle on the rail wheels.

These and other important objects of the invention will be further explained or will become apparent from the description, claims and drawings:

In the drawings:

FIG. 2 is a rear isometric view similar to FIG. 1 but showing the rear sub-frame and rail wheel assemblies;

FIG. 3 is a fragmentary isometric view showing the rear of a truck equipped with support structure embodying the principles of this invention;

FIG. 5 is a fragmentary, enlarged view of a wheel arm illustrating the releasable lock;

FIG. 6 is a fragmentary, enlarged vertical cross-sectional view through the leg and lock;

FIG. 7 is an enlarged side elevational view of one of the air bags;

FIG. 8 is a fragmentary front elevational view of the rear cross member of the rear sub-frame showing the stabilizer bar;

FIG. 9 is an enlarged side elevational view of a sub-frame swing limiter; and

FIG. 10 is an isometric view of one of the stops for a leg for a wheel and axle assembly. rectangular vehicle.

Figures 1, 4:
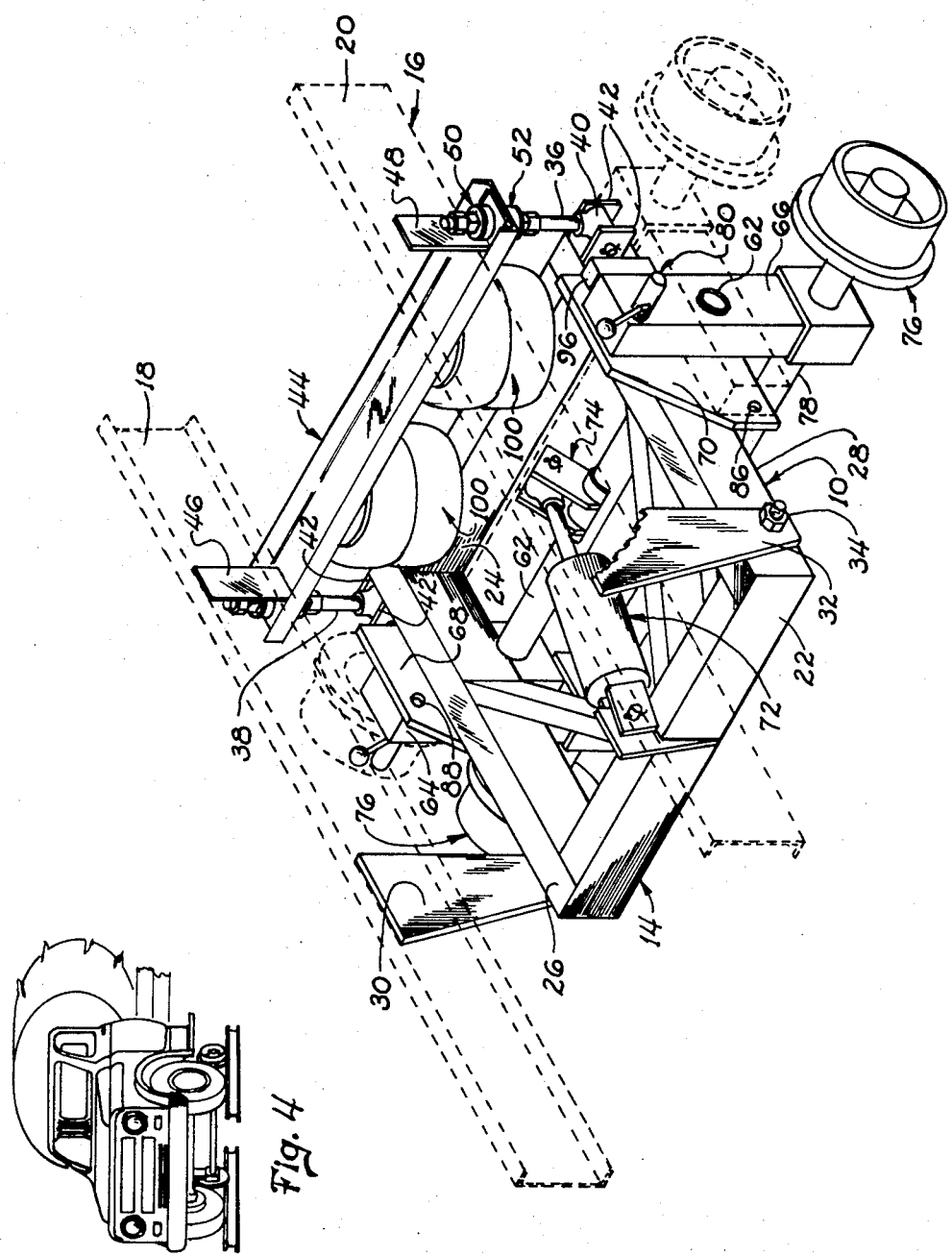
FIG. 1 is a front isometric view of the front sub-frame and rail wheel assemblies comprising a part of vehicle support embodying the principles of this invention, parts being broken away to reveal details of construction, the vehicle frame and the stand-by position for the rail wheel assemblies being shown in dash lines.
FIG. 4 is a view similar to FIG. 3 but showing the front end of the truck.

Apparatus for supporting a vehicle on rails pursuant to the principles of this invention includes a unit broadly designated 10 (FIG. 1) adapted for supporting the front of the vehicle and a unit broadly designated 12 (FIG. 2) for supporting the rear of the vehicle. Unit 10 includes a substantially rectangular sub-frame 14 for suspension beneath the conventional frame 16 of the vehicle. Frame 16 is represented diagrammatically in the drawings by the elongated, longitudinally extending frame members 18 and 20.

Sub-frame 14 includes a pair of elongated, rigid front and rear members 22 and 24 respectively held in spaced parallelism by side members 26 and 28. A pair of spaced apart depending brackets 30 and 32 respectively are adapted for attachment to corresponding frame members 18 and 20 in position for swingably attaching sub-frame 14 beneath the vehicle frame 16. Bolt means 34 (only one of which is shown in FIG. 1) pivotally couple the sub-frame to the brackets 30 and 32 in a manner so that the axis of swinging movement of sub-frame 14 extends horizontally adjacent the front of the sub-frame and transversely of the vehicle.

The extent of swinging movement of sub-frame 14 with respect to the vehicle frame is limited by a pair of upright rods 36 and 38 respectively carried at the opposite rear corners of the sub-frame. Each rod 36 and 38 has a trunnion 40 at its lowermost end and cooperating with outwardly extending, spaced apart ears 42 for pivotally coupling the rod to the sub-frame. Rods 36 and 38 extend through apertures (not shown) in an elongated, rigid bracket 44 extending transversely of the vehicle frame immediately above the sub-frame cross member 24. Bracket 44 is adapted for attachment to the vehicle frame members 18 and 20. To this end, upright plates 46 and 48 are rigidly secured to the bracket in positions permitting the plates to be welded to the outer surfaces of the respective members 18 and 20. Manifestly, any suitable means may be provided for attachment of the bracket to the vehicle frame.

Each rod 36 and 38 is externally threaded adjacent its uppermost end for attachment of a pair 'f spaced apart cushion structures 50 and 52. Each structure 50 and 52 includes a rigid backing 54 which may be bonded to a pad 56 disposed in facing relationship to the bracket 44 as best shown in FIG. 9. Structures 50 and 52 are internally threaded and are telescoped over the corresponding rods in threaded engagement therewith for adjustment with respect to their positions along the rods. Locknuts 58 and 60 cooperate with the corresponding structures 50 and 52 to secure the structures in their proper positions.

It is to be pointed out at this juncture and as is apparent in FIG. 9, that the spacing between structure 50 above bracket 44 and structure 52 therebelow permits limited movement of the sub-frame about its horizontal axis. The weight of the sub-frame can be supported by bracket 44 when structure 50 is resting on the bracket. Conversely, the weight of the vehicle frame can be transferred to the subframe when the latter is in a position with the lowermost structure 52 engaging the bottom surface of the bracket. It is of course apparent that the structures 50 and 52 for each rod 36 and 38 may be identical and should be positioned at corresponding distances along the respective rods so that each either bears a portion of the weight of the sub-frame or is in position to transfer a portion of the weight of the vehicle to the sub-frame.

An elongated, transversely circular shaft 62 is mounted to the sub-frame and projects outwardly from the side members 26 and 28. Shaft 62 extends parallel to members 22 and 24 and is intermediate the members. Elongated rigid legs 64 and 66 are rigidly secured to the projecting ends of the shaft 62 on either side of the sub-frame and immediately outboard of corresponding polygonal plates 68 and 70 carried by the members 26 and 28 respectively. Legs 64 and 66 rotate with the shaft on its longitudinal axis. Rotation of shaft 62 is provided for by a fluid piston and cylinder assembly 72 pivotally coupled to the front sub-frame member 22 and to a centrally positioned arm 74 extending radially from shaft 62. The legs 64 and 66 are secured to shaft 62 approximately midway between the ends of the leg and a wheel and axle assembly 76 is carried at the lowermost end of each leg respectively. Actually, each of the assemblies 76 includes a common axle 78 interconnecting the legs 64 and 66 whereby the strength and stability of the assemblies is enhanced.

The upper end of each leg 64 or 66 carries a releasable lock 80 best shown in FIGS. 5 and 6. Each lock includes a transversely circular tube 82 extending in parallel relationship to the axis of axle 78 and shaft 62 respectively. An elongated plunger 84 is carried in each tube 82 in telescoped relationship therein for engaging into either of a pair of apertures 86 and 88 in the plates 68 and 70. It will be understood that the apertures 86 and 88 correspond with the positions for legs 64 and 66 shown in full lines and in dash lines respectively in FIG. 1. Plunger 84 is urged into the corresponding aperture 86 or 88 by a spring 90 in tube 82 when the tubes are aligned with the apertures. An elongated helically extending slot 92 in tube 82 receives an elongated operating handle 94 projecting from plunger 84 and adapted to permit manual removal of each plunger from the apertures. A block 96 is secured to each of the plates 68 and 70 respectively and positioned on the corresponding plates to limit the extent of swinging movement of legs 64 and 66.

While sub-frame 14 is constructed for swinging about the axis of bolt means 34 within the limits defined by the positions of structures 50 and 52, cushion means in the form of a pair of pneumatic bags 100 is interposed between the sub-frame and bracket 44. Referring particularly to FIG. 7, the bags 100 comprise an inflatable structure 102 of yieldable material such as rubber or the like. A plurality of constricting rings 104 cooperate with structure 102 to provide for longitudinal extension of bags 100 upon the introduction of air into the structure. The bags 100 not only cushion any movement of the sub-frame with respect to the vehicle frame but also may be used for the transfer of weight between the sub-frame and bracket 44.

Referring now more particularly to FIG. 2 of the drawings, the unit 12 for the rear of the vehicle is constructed substantially similar to the construction heretofore described in detail with respect to the front unit 10. In this case, however, a transversely extending bracket 106 is adapted for coupling with the vehicle frame members 18 and 20 by corresponding side plates 108. Clevis structure 110 centrally positioned intermediate the ends of bracket 106 depends from the latter. Sub-frame 14 is pivotally coupled to bracket 106 by means of a forwardly projecting lug 112 which is received by the clevis structure.

Legs 114 and 116 are swingable with a rotatable shaft 118 by a fluid piston and cylinder assembly 120 in a manner similar to that previously described with respect to sub-frame 14. Also, each leg 114 and 116 carries a wheel and axle assembly 122. Blocks 124 and 126 (FIG. 10) have setscrews 128 and are positioned to engage legs 116 and 114 to limit the extent of swinging movement thereof as will be understood by those skilled in this art. Manifestly, setscrews 128 permit limited adjustment of the stopping positions for the legs.

An air bag 100 is provided at each side of sub-frame 130 of unit 12 and near the rear of the latter. The air bags cushion the swinging movement of sub-frame 130 about its horizontal axis defined by bolt 132 in clevis 110 in a similar manner to that previously described. The rear end of sub-frame 130 is supported for limited swinging movement by a transversely extending bracket 134 adapted to be coupled to the vehicle frame. Upright supports 136 and 138 may be constructed substantially similar to the construction described with respect to rods 36 and 38 and structure 50 and 52 respectively. Here again, the construction permits limited swinging movement of the sub-frame with respect to the vehicle frame within the limits defined by the cushion structures on the respective rods.

Inasmuch as the leading end of sub-frame 130 is coupled to the vehicle frame by a tongue and clevis arrangement, additional stability for the sub-frame against side-to-side swaying motion is provided by a stabilizer bar 140 (FIGS. 2 and 8). One end of bar 140 is pivotally coupled to the trailing cross member 142 of sub-frame 130 while the other end of bar 140 is pivotally coupled to bracket 134. The length of bar 140 may be adjusted as may be required.

In operation, the units 10 and 12 are positioned beneath the vehicle in locations for best supporting the weight of the vehicle. Normally, unit 12 will be at the extreme rear end of the vehicle and unit 10 may be immediately behind or even in front of the front road wheels. Assemblies 72 and 120 are operated to shift the wheels of the units into their stand-by positions when the vehicle is used for over the road travel. The weight of the wheels and the sub-frame is carried by the vehicle frame with the uppermost cushion structures 50 engaging their respective brackets 44 and 134.

The vehicle is readily converted for rail use by operating assemblies 72 and 120 to rotate the shafts 62 and 118 thereby swinging the flanged rail type wheels from their stand-by positions to the vehicle supporting positions.

Engagement of the rail wheels with the rails swings the sub-frames 14 and 130 about their horizontal axes of swinging movement. Such swinging occurs only to the point at which the lower cushion structures 52 engage the lower surface of the respective brackets 44 and 134. Thereafter the movement of the wheel legs to the load supporting positions lifts the vehicle through the sub-frame so that the weight of the vehicle is supported by the rail wheels.

No means is provided for powering the rail wheels since they are intended merely for support and guidance of the vehicle on the rails. Accordingly, it is necessary to lower the vehicle with respect, at least, to the rear unit 12 so that the tires of the power wheels of the vehicle engage the rails. It is only necessary that the engagement be sufficient for friction between the tires and the rails. Substantially all of the weight of the vehicle is supported by the flanged rail wheels.

The operator insures a smooth ride for the vehicle by adjusting the air pressure in the bags 100 so that the lowermost cushion structure 52 for each of the rods for units 10 and 12 are just below the respective brackets 44 and 134 but not actually in weight bearing positions. The air bags cushion the ride but any substantial relative swinging between the sub-frames and the vehicle frame is prevented by the positions of the cushion structures. In the unlikely event that air pressure should be diminished or lost entirely from the pneumatic bag structures, the cushion structures are in position to assume the weight without hazard to a vehicle traveling at a relatively high speed along the tracks.

The hydraulic and pneumatic systems have not been shown for the reason that the systems are conventional. It will be understood that the air bags are operably coupled by conduits or the like with a suitable source of air under pressure through valves and means for regulating the pressure in the respective bags. Further, the assemblies 72 and 120 are positive acting in either direction so that the rail wheels may be moved from stand-by to load supporting positions and back to stand-by positions at the will of the operator. Preferably, the controls for units 10 and 12 may be operated either simultaneously or individually as desired.

It is contemplated that most vehicles to be used for both road and rail travel will be provided with brackets welded or otherwise relatively permanently attached to the vehicles so that the rail units 10 and 12 can be conventionally installed and removed from the vehicles. It is, of course, possible to provide quickly detachable means other than the relatively permanent brackets for securing the rail units to the vehicle. Alternatively, the vehicles might be fabricated with units such as units 10 and 12 as permanently attached components of the vehicles without provision for convenient removal.

Having thus described the invention, what is claimed as new and desired to be secured by Letters Patent is:

1. For use with a highway vehicle having a frame, apparatus for supporting the vehicle for rail travel, said apparatus comprising:
   a longitudinally extending sub-frame adapted to be pivotally coupled adjacent one end of the sub-frame to said vehicle frame for vertical swinging movement about a horizontal axis;
   a plurality of flanged wheel and axle assemblies;
   means carried by the sub-frame and operably coupled with said assemblies for swingably mounting the latter on the sub-frame in horizontally spaced relationship from said axis and for movement with respect thereto from vehicle supporting positions and stand-by positions respectively;
   power means operably coupled with said assemblies for selectively moving the latter to and from said positions;
   rigid lost motion linkage adapted for coupling with the vehicle frame and coupled with the sub-frame in spaced relationship along the latter from said horizontal axis for permitting limited swinging movement of the sub-frame with respect to the vehicle frame about said axis; and
   pneumatic bag structure interposed between the sub-frame and the vehicle frame for cushioning the swinging of the sub-frame toward the vehicle frame under the moment imparted to the sub-frame by the assemblies when the latter are in said vehicle supporting positions.

2. The invention of claim 1, wherein said mounting means for said flanged wheel and axle assemblies includes a shaft rotatably secured to the corresponding sub-frame and extending transversely thereof, and a pair of elongated, radially extending, parallel, spaced apart arms secured to each shaft respectively, an assembly being carried on each arm, said power means being operably coupled with the respective shafts for rotating the shafts whereby to move the assemblies to and from said positions.

3. The invention of claim 1, wherein said lost motion linkage includes structure for limiting the swinging of said sub-frame in either direction about said horizontal axis.

4. The invention of claim 3, wherein said structure includes a bracket adapted for coupling to said vehicle frame, said bracket having an aperture therethrough, a rod coupled with the sub-frame and extending through the bracket aperture, and a pair of abutments on the rod and spaced apart longitudinally thereof, one of said abutments being on one side of the bracket and the other abutment being on the other side of the bracket, whereby swinging of the sub-frame about the horizontal axis is limited to the distance between said abutments.

5. The invention of claim 4, wherein each of said abutments includes a cushion of resilient material disposed to engage a corresponding side of said bracket upon a predetermined amount of swinging of the sub-frame in either direction about said horizontal axis.

6. The invention of claim 4, wherein said structure includes means for selectively adjusting the positions of said abutments on said rod.

7. The invention of claim 4, wherein said sub-frame is rectangular, and wherein is provided a pair of structures for limiting the swinging of the sub-frame relative to the vehicle frame, each structure being disposed at a corner of the sub-frame remote from said horizontal axis.

8. For use with a highway vehicle having a frame, apparatus for supporting the vehicle for rail travel, said apparatus comprising:
a pair of sub-frames, said sub-frames being adapted for coupling to the vehicle frame for supporting the front and rear of the vehicles respectively and for swinging movement about horizontal axes at one end of each of the corresponding sub-frames;
a pair of flanged rail wheel and axle assemblies for each sub-frame, each assembly being carried by its corresponding sub-frame and swingably with respect thereto;
power means for each sub-frame, each power means being operably coupled with its respective sub-frame and with the corresponding assemblies for swinging the latter to and from vehicle supporting positions engaging said rails;
rigid lost motion linkage for each sub-frame adapted for coupling with the vehicle frame and coupled with the corresponding sub-frames in spaced relationship along the latter from said corresponding horizontal axes for permitting limited swinging movement of the respective sub-frames with respect to the vehicle frame about said axes; and
pneumatic means interposed between each respective sub-frame and the vehicle frame for cushioning the load from said wheels when the assemblies are in said vehicle supporting positions tending to swing the sub-frames toward the vehicle frame about the respective horizontal axes.

9. The invention of claim 8, wherein said sub-frames are rectangular, and wherein said horizontal axes extend transversely of the vehicle adjacent the leading end of each sub-frame.

10. The invention of claim 8, wherein is included a lock for each assembly respectively, each lock including components carried by the respective assemblies and automatically engageable with the corresponding sub-frame for releasably securing the assemblies in said supporting and stand-by positions.

11. The invention of claim 10, wherein said sub-frames are provided with openings corresponding with said supporting and stand-by positions for the respective assemblies, and wherein each lock includes a transversely circular tube for each assembly, each tube being secured to its respective assembly for movement therewith, a plunger in each tube, and spring means in the tubes and engageable with corresponding plungers for urging the latter into the sub-frame holes when the assemblies are swung to said positions.

12. The invention of claim 11, wherein each tube has a helically extending slot in the sidewall thereof, and wherein is provided an elongated handle for each plunger respectively, each handle being secured to its corresponding plunger and projecting outwardly through the tube slot for manual movement of the plunger out of a sub-frame hole.

* * * * *